(12) United States Patent
Chelstrom et al.

(10) Patent No.: US 8,144,689 B2
(45) Date of Patent: Mar. 27, 2012

(54) CONTROLLING ASYNCHRONOUS CLOCK DOMAINS TO PERFORM SYNCHRONOUS OPERATIONS

(75) Inventors: Nathan P. Chelstrom, Cedar Park, TX (US); Mack W. Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/128,315

(22) Filed: May 28, 2008

(65) Prior Publication Data

US 2008/0229136 A1 Sep. 18, 2008

Related U.S. Application Data

(63) Continuation of application No. 11/255,156, filed on Oct. 20, 2005, now Pat. No. 7,492,793.

(51) Int. Cl.
*H04L 12/28* (2006.01)

(52) U.S. Cl. ........ 370/351; 370/503; 370/535; 714/731; 714/744; 713/600; 713/400; 713/375; 713/500

(58) Field of Classification Search .................. None
See application file for complete search history.

(56) References Cited

U.S. PATENT DOCUMENTS

| | | | |
|---|---|---|---|
| 5,325,405 A | 6/1994 | Marko et al. | |
| 5,402,448 A | 3/1995 | Marko et al. | |
| 5,522,048 A | 5/1996 | Offord et al. | |
| 7,200,767 B2 | 4/2007 | Jonnalagadda | |
| 7,492,793 B2 | 2/2009 | Chelstrom et al. | |
| 7,560,956 B2 * | 7/2009 | Waldrop | 326/93 |
| 2005/0240847 A1 | 10/2005 | Nadeau-Dostie et al. | |
| 2006/0291323 A1 * | 12/2006 | Freebern | 365/233 |
| 2009/0106575 A1 | 4/2009 | Chelstrom et al. | |

OTHER PUBLICATIONS

U.S. Appl. No. 11/255,156.
U.S. Appl. No. 12/339,157.

* cited by examiner

*Primary Examiner* — Kibrom T Hailu
(74) *Attorney, Agent, or Firm* — Stephen J. Walder, Jr.; Matthew B. Talpis (57) ABSTRACT

A mechanism for controlling asynchronous clock domains to perform synchronous operations is provided. With the mechanism, when a synchronous operation is to be performed on a chip, the latches of the functional elements of the chip are controlled by a synchronous clock so that the latches are controlled synchronously even across asynchronous boundaries of the chip. The synchronous operation may then be performed and the chip's functional elements returned to being controlled by a local clock in an asynchronous manner after completion of the synchronous operation. This synchronous operation may be, for example, a power on reset (POR) operation, a manufacturing test sequence, debug operation, or the like.

17 Claims, 4 Drawing Sheets

CONTROLLING ASYNCHRONOUS CLOCK DOMAINS TO PERFORM SYNCHRONOUS OPERATIONS

This application is a continuation of application Ser. No. 11/255,156, filed Oct. 20, 2005, status pending.

BACKGROUND

1. Technical Field

The present application relates generally to an improved information processing device. More specifically, the present application is directed to an apparatus and method for controlling asynchronous clock domains to perform synchronous operations.

2. Description of Related Art

Highly integrated microprocessor and system-on-a-chip integrated circuits contain many different functional elements. The core logic of microprocessors run with gigahertz clocks. However, when input/output (I/O) and memory devices are incorporated on the same chip, these devices will require different clocking requirements. For a scan based design, i.e. a design in which data is scanned through the latch elements of the various functional elements of the microprocessor or system-on-a-chip, the different clocking requirements creates asynchronous boundaries between the core logic and the other functional elements. Scanning across asynchronous clock boundaries is problematic because latch setup and hold times cannot be established reliably between the two clocking environments.

This is especially a problem with power on reset (POR) and manufacturing test sequences. During a power on reset sequence, the desire is to have all digital logic running on the same clock. This will allow the POR engine to scan all latch elements to initialize the chip to a known state. A similar requirement for the latches to run on the same clock is present for performing manufacturing test sequences. This, however, is not possible with microprocessors or systems-on-a chip that have different clocking domains on the chip. As a result, during a POR or manufacturing test, the POR logic and test logic must treat each clock domain separately. Thus, the design and implementation of a POR engine and test circuitry becomes more complex in order to properly performing a POR or manufacturing test sequence.

SUMMARY

In view of the above, it would be beneficial to have an improved mechanism for controlling asynchronous clock domains so as to permit scan based power on reset (POR) and test sequences to be performed across asynchronous boundaries in a microprocessor or system-on-a-chip. The exemplary embodiments illustrative of the present invention provide such a mechanism.

With an illustrative embodiment, when a synchronous operation is to be performed on a microprocessor or system-on-a-chip, hereafter collectively referred to as a "chip," the latches of the functional elements of the chip are controlled by a synchronous clock in such a manner that the latches are controlled synchronously even across asynchronous boundaries of the chip. The synchronous operation may then be performed and the chip's functional elements returned to being controlled by a local clock in an asynchronous manner after completion of the synchronous operation. This synchronous operation may be, for example, a power on reset (POR) operation, a manufacturing test sequence, debug operation, or the like.

With one exemplary embodiment illustrative of the present invention, a test hold or "thold" generation circuit is provided for switching latches of a chip from being controlled by their local asynchronous clocks to being controlled by a synchronous core clock and vice versa. This thold generation circuit is used to place the scan latches of the functional elements of the chip in a synchronous core clock mode of operation so that synchronous operations may be performed on the functional elements, and then return them to their local clock mode of operation after completion of the synchronous operations.

In addition to the "thold" generation circuit, a local clock buffer is provided that has the capability to select between two input clocks. The local clock buffer may be a multiplexed local clock buffer. The multiplexed local clock buffer may receive a local clock and system clock as inputs and may output a selected one of the two clocks to the latches for synchronous or asynchronous operation.

In one exemplary embodiment illustrative of the present invention, a method, in an integrated circuit, for performing a synchronous operation across a synchronous/asynchronous clock domain boundary. The method may comprise switching one or more first devices in an asynchronous clock domain of the integrated circuit from an asynchronous clock mode of operation to a synchronous clock mode of operation. A synchronous operation may be performed using one or more second devices in a synchronous clock domain and the one or more first devices in the asynchronous clock domain of the integrated circuit. The one or more first devices in the asynchronous clock domain of the integrated circuit may then be returned to the asynchronous clock mode of operation.

The switching of the one or more first devices in an asynchronous clock domain from an asynchronous clock mode of operation to a synchronous clock mode of operation may comprises controlling a test mode input signal, a system clock enable signal, and an asynchronous clock hold signal so as to switch an input clock signal to the one or more first devices from a local asynchronous clock signal to a synchronous system clock signal. The one or more first devices may include a switching unit that selects one of the local asynchronous clock signal and the synchronous system clock signal for output to the one or more first devices in the asynchronous domain based on a state of the system clock enable signal. The switching unit may be a multiplexed local clock buffer that multiplexes the local asynchronous clock signal and the synchronous system clock signal.

Controlling a test mode input signal, a system clock enable signal, and an asynchronous clock hold signal may comprise asserting the asynchronous clock hold signal to a first AND gate of a test hold generation logic unit, asserting the test mode input signal to the first AND gate in the test hold generation logic unit, and asserting the system clock enable signal to the one or more first devices. The asynchronous clock hold signal and the test mode input signal may be AND'd by the first AND gate in the test hold generation logic to generate a test hold signal. The system clock enable signal may cause the synchronous system clock signal to be selected for clocking the one or more first devices.

The test mode input signal may be asserted after a test mode delay period following assertion of the asynchronous clock hold signal. The system clock enable signal may be asserted after a system clock enable delay period following assertion of the test mode input signal.

The method may further comprise determining if a synchronous operation has completed and de-asserting the system clock enable signal to the one or more first devices, if a synchronous operation has completed. In addition, the method may further comprise de-asserting the test mode input signal to the AND gate in the test hold generation logic, if a synchronous operation has completed, and de-asserting the asynchronous clock hold signal to the AND gate in the test hold generation logic, if a synchronous operation has completed.

The test mode input signal may be asynchronous and may be provided to one or more synchronization latches to synchronize the test mode input signal with the synchronous system clock signal. The synchronized test mode input signal and a full clock rate signal may be provided as inputs to a second AND gate which outputs a unit test hold signal. The unit test hold signal and a synchronized test hold signal output from the first AND gate may be provided as inputs to a first OR gate which outputs an output signal to be distributed to the one or more first devices.

A scan gate signal and an activate signal may be provided to a second OR gate associated with the one or more first devices. An output of the second OR gate associated with the one or more first devices may be provided as an input to a NAND gate associated with the one or more first devices. The output signal of the first OR gate may be provided to the NAND gate associated with the one or more first devices and an output of the NAND gate may be provided to a third OR gate associated with the one or more first devices. An output of a multiplexer associated with the one or more first devices may be provided as an input to the third OR gate.

The synchronous operation may be one of a power-on-reset operation, a manufacturing test sequence, or a debug operation. The method may be implemented by a test hold generation circuit provided in a test control unit of the integrated circuit.

In one exemplary embodiment illustrative of the present invention, an apparatus for performing a synchronous operation across a synchronous/asynchronous clock domain boundary is provided. The apparatus may comprise a test hold generation logic unit and a switching unit coupled to the test hold generation logic, and associated with one or more first devices in an asynchronous clock domain. The test hold generation logic may control the switching unit to switch the one or more first devices from an asynchronous clock mode of operation to a synchronous clock mode of operation. The test hold generation logic may further control the switching unit to return the one or more first devices to the asynchronous clock mode of operation. A synchronous operation may be performed using one or more second devices in a synchronous clock domain and the one or more first devices in the asynchronous clock domain while the one or more first devices are in the synchronous clock mode of operation.

These and other features and advantages of the present invention will be described in, or will become apparent to those of ordinary skill in the art in view of, the following detailed description of the exemplary embodiments illustrative of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
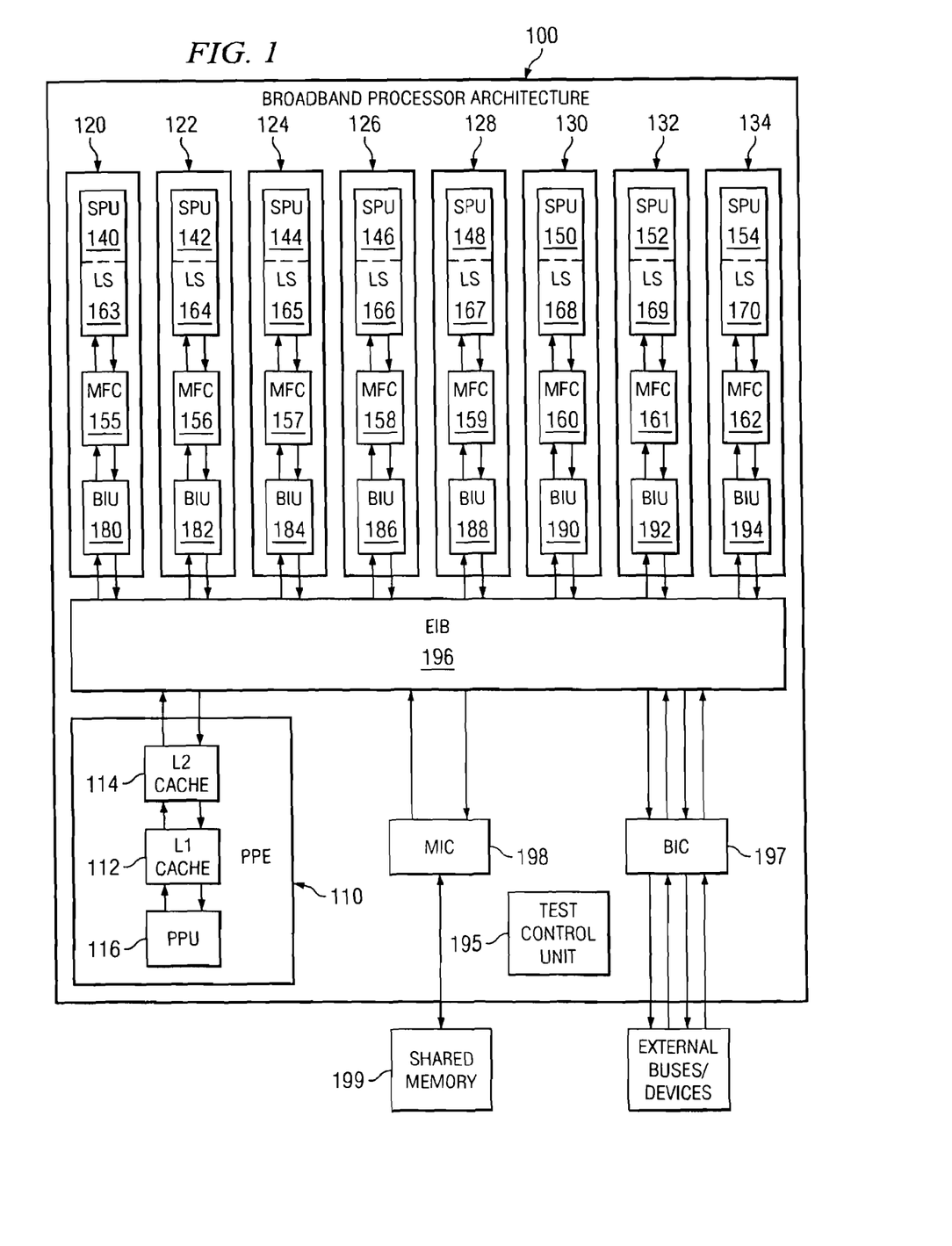
FIG. 1 is an exemplary block diagram of a microprocessor chip in which exemplary aspects of an illustrative embodiment of the present invention may be implemented.

The illustrative embodiment provides an apparatus and method for controlling asynchronous clock domains to perform synchronous operations. The mechanisms of the illustrative embodiment may be implemented in any information, e.g., instructions and/or data, processing system in which boundaries between synchronous and asynchronous clock domains, with regard to a system clock, exist and it is desirable to perform synchronous operations across these boundaries. One such exemplary information processing system is the Cell Broadband Engine (CBE) architecture available from International Business Machines Corporation of Armonk, N.Y. FIG. 1 provides an exemplary block diagram of a microprocessor employing the CBE architecture. It should be appreciated that the exemplary microprocessor shown in FIG. 1 is only exemplary and is not intended to state or imply any limitation with regard to the information processing systems or environments in which the exemplary aspects of an illustrative embodiment may be implemented.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPUs execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the information would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for information transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

In the architecture shown in FIG. 1, the PPE 110 may operate based on a system clock while other elements of the architecture may operate according to local clocks for those elements. For example, SPEs 120-134 may operate on different clocks than the PPE 110 and thus, give rise to a synchronous/asynchronous clock domain boundary. As mentioned above, such boundaries introduce complexity into Power-on-Reset (POR), testing, and debug logic which require synchronous clocking of the elements. Thus, with such boundaries, it is desirable to have a mechanism for controlling asynchronous clock domains so as to permit scan based power on reset (POR), test, and debug sequences to be performed across asynchronous boundaries. The exemplary embodiments illustrative of the present invention provide such a mechanism.

With an illustrative embodiment, when a synchronous operation is to be performed on a microprocessor or system-on-a-chip, such as the architecture shown in FIG. 1, hereafter collectively referred to as a "chip," the latches of the functional elements of the chip are controlled by a synchronous clock so that the latches are controlled synchronously even across asynchronous boundaries of the chip. The synchronous operation may then be performed and the chip's functional elements returned to being controlled by a local clock in an asynchronous manner after completion of the synchronous operation. This synchronous operation may be, for example, a power on reset (POR) operation, a manufacturing test sequence, debug operation, or the like.

With one exemplary embodiment illustrative of the present invention, a test hold or "thold" generation circuit is provided, such as in a test control unit 195, for switching latches of a chip from being controlled by their local asynchronous clocks to being controlled by a synchronous core clock and vice versa. This thold generation circuit is used to place the scan latches of the functional elements of the chip in a synchronous core clock mode of operation so that synchronous operations may be performed on the functional elements, and then return them to their local clock mode of operation after completion of the synchronous operations.

In addition to the "thold" generation circuit, a local clock buffer is provided that has the capability to select between two input clocks. The local clock buffer may be a multiplexed local clock buffer in which a local clock and system clock are provided as inputs and one of the two clocks are selected for output to the latches for synchronous or asynchronous operation.

Figure 2:
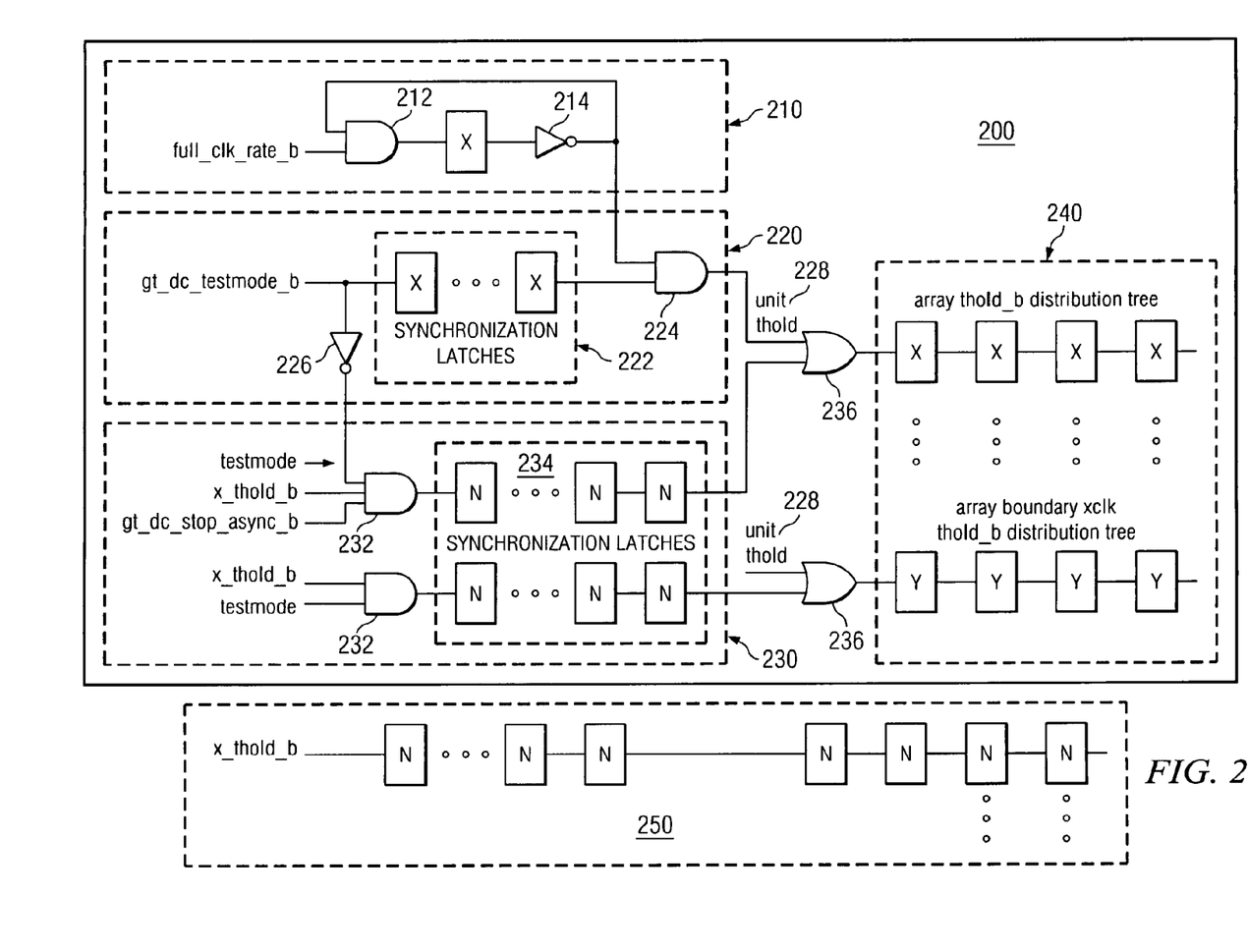
FIG. 2 is an exemplary diagram illustrating a thold generation circuit in accordance with one exemplary embodiment illustrative of the present invention.

FIG. 2 is an exemplary diagram illustrating a thold generation circuit in accordance with one exemplary embodiment illustrative of the present invention. As mentioned above, this thold generation circuit may be provided, for example, in a functional logic unit on the system-on-a-chip or microprocessor. This functional logic unit may provide an interface with external off-chip equipment such that synchronous operations may be performed on-chip under the direction of the off-chip equipment. For example, this functional logic unit, in one exemplary embodiment, may be a test control unit that provides control information and interfaces with a manufacturing tester during a test of the operation of the system-on-a-chip. Such a test control unit may also have control logic, such as a Power On Reset (POR) engine, or the like.

With regard to FIG. 2, xclk refers to the asynchronous clock signal for an asynchronous functional unit while nclk refers to the system clock. Xclk is asynchronous to nclk. As shown in FIG. 2, the thold generation circuit 200 includes xclk hold generation logic 210, testmode logic 220, asynchronous clock stopping logic 230, and xclk thold_b distribution logic 240. The thold generation circuit 200 is used to control the clock of the asynchronous xclk domain.

The synchronous clock domain 250 is also shown in FIG. 2. As shown, the synchronous clock domain 250 includes synchronization latches and a nclk thold_b distribution tree. The x_thold_b signal, discussed hereafter, is distributed to the latches in the nclk thold_b distribution tree. The x_thold_b signal is used along with other signals, as discussed hereafter, to control the clock signals used to clock the latches to thereby place the latches in either a synchronous or asynchronous mode of operation.

The xclk hold generation logic 210 receives, as an input signal, a full_clk_rate_b input signal. The full_clk_rate_b signal is generated by logic in asynchronous such as BIC 197 and MIC 198. The logic in the asynchronous unit may be as simple as logic for providing a configuration bit, or more complex logic that determines when the unit will run at full clock rate. It should be kept in mind that the xclk hold generation logic 210 operates in the asynchronous clock domain.

The full_clk_rate_b input signal is AND'd, by AND gate 212, with a feedback signal from the output of xclk hold generation logic 210, which is an inverted form of the output from AND gate 212, as output by inverter 214. Thus, when both full_clk_rate_b and the feedback signal are high, the output of the AND gate 212 is high, but the output of inverter 214 is low and thus, the output of the xclk hold generation logic 210 is low. Similarly, when both full_clk_rate_b and the feedback signal are low, or when full_clk_rate_b and the feedback signal are at opposite states, the output of the AND gate 212 is low and the output of the inverter 214 is high. The output from the inverter 214 is fed back to the AND gate 212 but is also provided as an output of the xclk hold generation logic 210 to the AND gate 224 of testmode logic 220.

The testmode logic 220 receives, as input, a gt_dc_testmode_b signal. This gt_dc_testmode_b signal determines if the x_thold_b signals are being acknowledged from the synchronous logic or from the asynchronous logic. That is, when the gt_dc_testmode_b signal is asserted, as discussed hereafter, the asynchronous signals from xclk hold generation logic 210 are not permitted to clock the latches in the xclk distribution logic 230. Again, asynchronous logic is denoted by the clock signal "xclk."

The gt_dc_testmode_b signal is provided to synchronization latches 222 and is also inverted by inverter 226 and provided as an input to the AND gate 232 of asynchronous clock stopping logic 230. Because signals such as the gt_dc_testmode_b signal are asynchronous signals, the synchronization latches 222 are used to change the asynchronous signals to synchronous signals that are aligned to the nclk. The signal gt_dc_testmode_b is asynchronous in that it is generated by logic in the nclk domain but controls logic in xclk domain.

The output from synchronization latches 222 is provided as an input to AND gate 224. As a result, when both the gt_dc_testmode_b signal is high and the output from the xclk hold generation logic 210 is high, the unit thold signal 228 is high. When either or both of the gt_dc_testmode_b signal and the output from xclk hold generation logic 210 are low, the unit thold signal 228 is low. Thus, the assertion of the gt_dc_testmode_b signal, which is low when asserted (note again that "_b" signals are low when asserted), causes the unit thold signal 228 to be low.

The gt_dc_testmode_b signal is inverted by inverter 226 and the inverted signal, testmode, is provided as an input to AND gate 232 of asynchronous clock stopping logic 230. Thus, if the gt_dc_testmode_b signal is asserted, i.e. is low, then the testmode signal is high. In addition to the testmode signal, an x_thold_b signal is provided as an input to AND gate 232 of asynchronous clock stopping logic 230. When the x_thold_b signal is asserted, it is low as well, but it is not inverted prior to being provided to AND gate 232. The x_thold_b signal is used in combination with a gt_dc_nclk_en_b signal to control which clock signal, i.e. nclk or xclk, is to be output to the latches in the xclk thold_b distribution logic 240, as will be discussed hereafter.

When the testmode signal is high, i.e. gt_dc_testmode_b is asserted, and the x_thold_b signal is high, i.e. the x_thold_b signal is de-asserted, the output of the AND gate 232 to synchronization latches 234 is high. When either the testmode signal is low, i.e. the gt_dc_testmode_b signal is not asserted, or the x_thold_b signal is low, i.e. the x_thold_b signal is asserted, then the output of the AND gate 232 to the synchronization latches 234 is low.

The output of the synchronization latches 234 is provided as an input to OR gate 236 along with the unit thold signal 228. If either the unit thold signal 228 or the output from synchronization latches 234 is high, the output of the OR gate 236 to the xclk thold_b distribution logic 240 is high, i.e. the x_thold_b signal is high to the xclk thold_b distribution logic 240. Thus, when the asynchronous signal full_clk_rate_b is asserted (Low) and the gt_dc_testmode_b signal is not asserted (High), then the unit thold signal is high to OR gate 236. In such a case, the synchronization latches 234 is low as a function of gt_dc_testmode_b, the output of the OR gate 235 will be high, i.e. x_thold_b that is distributed to the latches of the xclk thold_b distribution tree 240 will be high.

In other words, if the gt_dc_testmode_b signal is not asserted, then the asynchronous logic is permitted to control clocking of the latches in the xclk thold_b distribution tree 240.

Whether or not the full_clk_rate_b signal is asserted (Low), if the gt_dc_testmode_b signal is asserted (Low), then the unit thold signal is low to OR gate 236. In this case, the testmode signal will be high. If the x_thold_b signal is asserted (Low), then the output to OR gate 236 is a synchronized (Low) thold_b signal. As a result, the output of the OR gate 236 is a low thold_b signal. If the x_thold_b signal is not asserted (High), then the output to OR gate 236 is a synchronized (High) thold_b signal. As a result, the output of the OR gate 236 is a high thold_b signal.

Thus, in summary, the assertion of the gt_dc_testmode_b signal is used to stop the asynchronous control of the latches in the xclk thold_b distribution tree 240. The x_thold_b signal is used to synchronously scan in information to the latches of the xclk thold_b distribution tree 240, as will be described in greater detail hereafter with reference to FIG. 3.

An optional gt_dc_stop_async_b signal input may also be provided to AND gate 232, but this signal is not necessary to the operation of the illustrative embodiment. The gt_dc_stop_async_b signal input is a signal input that allows the xclk domain to be stopped while the nclk domain continues to run. This feature enables the testing of the nclk domain while holding a fixed value in the xclk domain. This is useful for speed sorting nclk logic, for example.

Figure 3:
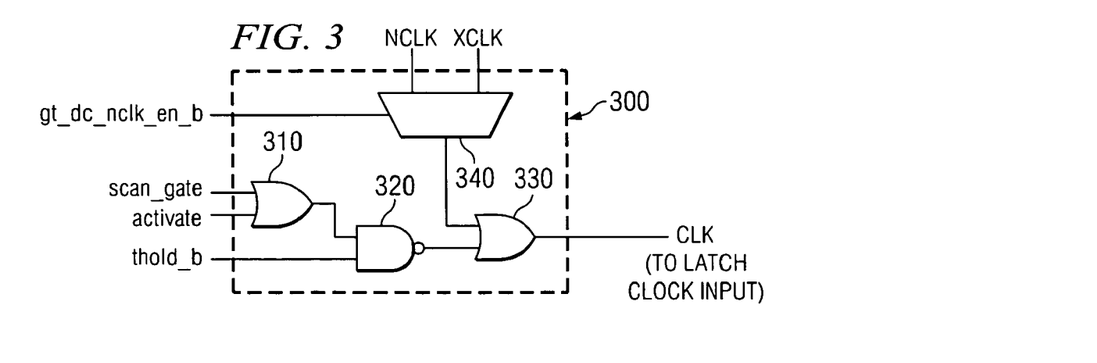
FIG. 3 is an exemplary diagram of a multiplexed local clock buffer in accordance with an exemplary embodiment illustrative of the present invention.

FIG. 3 is an exemplary diagram of a multiplexed local clock buffer in accordance with an exemplary embodiment illustrative of the present invention. Each of the latches in the distribution logic or distribution trees shown in FIG. 2 may have a corresponding multiplexed local clock buffer such as that shown in FIG. 3. As shown in FIG. 3, the multiplexed local clock buffer (MLCB) 300 includes an OR gate 310 providing an input to NAND gate 320. The OR gate 310 receives as inputs a scan_gate input signal and an activate input signal. These signals are used to scan in information for a synchronous operation to the corresponding latch, such as information for a Power-on Reset (POR) operation, a manufacturing test operation, or a debug operation. If either of these input signals to the OR gate 310 is high, then the output to the NAND gate 320 is high.

The NAND gate 320 receives the output from the OR gate 310 and the x_thold_b signal from the thold generation circuit 200. If both of these signals are high, then the output of the NAND gate 320 is low. If either or both of these signals is low, then the output of the NAND gate 320 is high. The output of the NAND gate 320 is provided as an input to OR gate 330.

The OR gate 330 also receives, as an input, a clock signal from multiplexer 340. The clock signal is either the synchronous system clock, i.e. nclk, or the asynchronous local clock, i.e. xclk. The select signal for selecting which clock signal is output by the multiplexer 340 is the gt_dc_nclk_en_b signal which is provided by the test control unit 195, for example. The test control unit 195 contains logic and/or connections to the external off-chip manufacturing tester, or other external equipment, through which instructions/data may be received to determine how to generate the appropriate select signal.

The selected clock is provided as an input to the OR gate 330 which then outputs the clock signal clk to the latches of the distribution logic of distribution trees in the synchronous and asynchronous domains. In this way, the latches in the asynchronous domain may be placed in a synchronous mode of operation in order to perform synchronous operations, such as Power-on Reset (POR), testing, debugging, and the like, and then returned to an asynchronous mode of operation.

Figure 4:
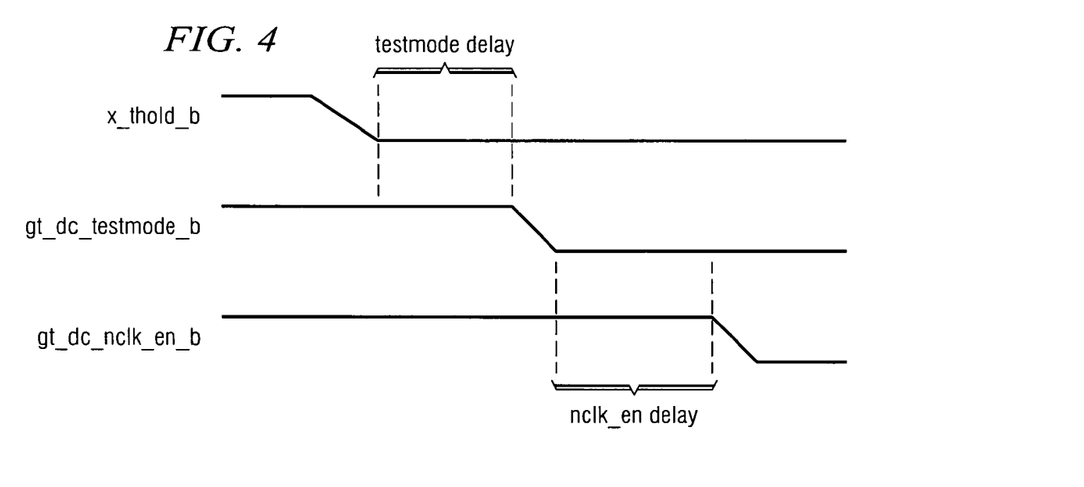
FIG. 4 is an exemplary diagram illustrating signal transitions for transitioning from a local clock control to a core clock control of the latches.

FIG. 4 is an exemplary diagram illustrating signal transitions for transitioning from a local or local clock control to a core or system clock control of the latches, i.e. from the xclk to the nclk. As shown in FIG. 4, in order to transition from the xclk to the nclk, the x_thold_b signal is brought low and the gt_dc_testmode_b signal is brought low after a testmode delay. The gt_dc_nclk_en_b signal is brought low after a nclk_en delay period. The combination of the low x_thold_b signal, low gt_dc_testmode_b signal, and low gt_dc_nclk_en_b signal causes the multiplexed local clck_buffers of the latches in the distribution trees or distribution logic to switch from the xclk controlling the latches to the nclk controlling the operation of the latches.

Figure 5:
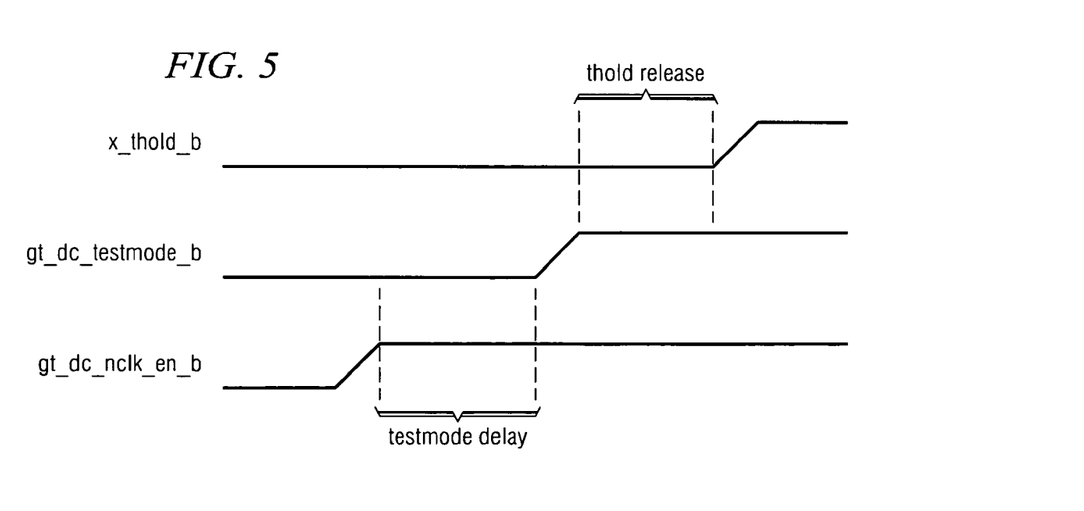
FIG. 5 is an exemplary diagram illustrating signal transitions for transitioning from a core clock control of latches back to a local clock control of the latches.

FIG. 5 is an exemplary diagram illustrating signal transitions for transitioning from a core or system clock control of latches back to a local or local clock control of the latches. As shown in FIG. 5, in order to transition from the nclk to the xclk controlling the operation of the latches in the distribution tree or distribution logic, the gt_dc_nclk_en_b signal is first brought high. The gt_dc_testmode_b is brought high after a testmode delay. Then the x_thold_b signal is brought high after a thold release period. This combination of high signals causes the multiplexed local clock buffer to select and output the xclk to the latches of the distribution tree or distribution logic.

Figure 6:
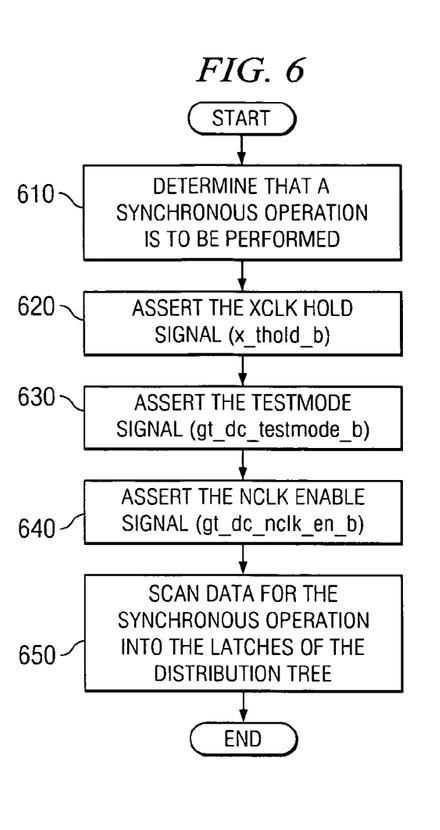
FIG. 6 is a flowchart outlining an exemplary operation illustrative of the present invention for switching latches in an asynchronous domain from an asynchronous mode of operation to a synchronous mode of operation.
Figure 7:
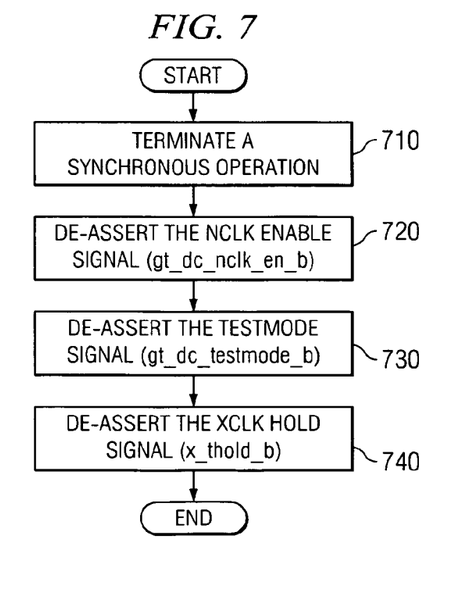
FIG. 7 is a flowchart outlining an exemplary operation illustrative of the present invention for returning latches in an asynchronous domain to an asynchronous mode of operation.

FIGS. 6 and 7 are flowcharts outlining exemplary operations of an illustrative embodiment for switching clock inputs to latches of an asynchronous domain. It will be understood that each block, and combination of blocks, of the flowchart illustration in FIGS. 6 and 7 can be implemented by computer program instructions. These computer program instructions may be provided to a processor or other programmable information processing apparatus to produce a machine, such that the instructions which execute on the processor or other programmable information processing apparatus create means for implementing the functions specified in the flowchart block or blocks. These computer program instructions may also be stored in a computer-readable memory or storage medium that can direct a processor or other programmable information processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation of an illustrative embodiment of the present invention for switching latches in an asynchronous domain from an asynchronous mode of operation to a synchronous mode of operation. As shown in FIG. 6, the operation starts with test control unit, e.g., a Power-On Reset engine or manufacturing testing unit, determining that a synchronous operation is to be performed (step 610). As mentioned above, this synchronous operation may be, for example, a Power-on Reset operation, a manufacturing testing operation, a debug operation, or the like. The test control unit asserts a xclk hold signal, i.e. the x_thold_b signal is brought low (Note that "_b" signals are active low) (step 620). The test control unit also asserts the testmode signal, i.e. the gt_dc_testmode_b signal is brought low (step 630). The test control unit asserts the nclk enable signal, i.e. the gt_dc_nclk_en_b signal is brought low (step 640). The test control unit then scans-in the information for the synchronous operation into the latches of the distribution tree (step 650) and the operation terminates.

FIG. 7 is a flowchart outlining an exemplary operation of an illustrative embodiment of the present invention for returning latches in an asynchronous domain to an asynchronous mode of operation. As shown in FIG. 7, the operation starts with the test control unit terminating a synchronous operation, e.g., Power-on-Reset operation, manufacturing testing operation, debug operation, or the like (step 710). The test control unit de-asserts the nclk enable signal, i.e. the gt_dc_nclk_en_b signal is brought high (step 720). The test control unit de-asserts the testmode signal, i.e. the gt_dc_testmode_b signal is brought high (step 730). The test control unit de-asserts the xclk hold signal, i.e. the x_thold_b signal is brought high (step 740) and the operation terminates.

Thus, the illustrative embodiments of the present invention provide a mechanism for switching devices, e.g., latches, in an asynchronous clock domain to a synchronous mode of operation. In this way, operations that require synchronous clocking of devices, e.g., Power-on-Reset (POR) operations, manufacturing testing operations, and debug operations, may be performed across synchronous/asynchronous clock domain boundaries. The mechanisms of the illustrative embodiments of the present invention further provide for switching operational modes of the devices in the asynchronous clock domain back to an asynchronous mode of operation. As a result of the illustrative embodiments of the present invention, the complexity of handling synchronous/asynchronous clock domain boundaries during such synchronous operations is minimized.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, e.g., portable computing devices, desktop computing devices, gaming console systems, handheld computing devices, and the like.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in an integrated circuit, for performing a synchronous operation across a synchronous/asynchronous clock domain boundary, comprising: switching one or more first devices in an asynchronous clock domain of the integrated circuit from an asynchronous clock mode of operation to a synchronous clock mode of operation; performing the synchronous operation using one or more second devices in a synchronous clock domain and the one or more first devices in the asynchronous clock domain of the integrated circuit; and returning the one or more first devices in the asynchronous clock domain of the integrated circuit to the asynchronous clock mode of operation, wherein switching the one or more first devices in an asynchronous clock domain from an asynchronous clock mode of operation to a synchronous clock mode of operation, comprises controlling a test mode input signal, a system clock enable signal, and an asynchronous clock hold signal so as to switch an input clock signal to the one or more first devices from a local asynchronous clock signal to a synchronous system clock signal, wherein the test mode input signal indicates whether latches in asynchronous clock distribution logic are permitted to be clocked by asynchronous signals or not, the system clock enable signal indicates whether the synchronous system clock signal is to be used or not, and the asynchronous clock hold signal controls switching between the local asynchronous clock signal and the synchronous system clock signal.

2. The method of claim 1, wherein the one or more first devices include a switching unit that selects one of the local asynchronous clock signal or the synchronous system clock signal for output to the one or more first devices in the asynchronous domain based on a state of the system clock enable signal.

3. The method of claim 2, wherein the switching unit is a multiplexed local clock buffer that multiplexes the local asynchronous clock signal and the synchronous system clock signal.

4. The method of claim 1, wherein controlling a test mode input signal, a system clock enable signal, and an asynchronous clock hold signal comprises:
asserting the asynchronous clock hold signal to a first AND gate of a test hold generation logic unit;
asserting the test mode input signal to the first AND gate in the test hold generation logic unit; and
asserting the system clock enable signal to the one or more first devices, wherein the asynchronous clock hold signal and the test mode input signal are ANDed by the first AND gate in the test hold generation logic to generate a test hold signal, wherein the system clock enable signal causes the synchronous system clock signal to be selected for clocking the one or more first devices.

5. The method of claim 4, wherein the test mode input signal is asserted after a test mode delay period following assertion of the asynchronous clock hold signal, and wherein the system clock enable signal is asserted after a system clock enable delay period following assertion of the test mode input signal.

6. The method of claim 4, further comprising:
determining if a synchronous operation has completed;
de-asserting the system clock enable signal to the one or more first devices, if a synchronous operation has completed;
de-asserting the test mode input signal to the AND gate in the test hold generation logic, if a synchronous operation has completed; and
de-asserting the asynchronous clock hold signal to the AND gate in the test hold generation logic, if a synchronous operation has completed.

7. The method of claim 4, wherein:
the test mode input signal is asynchronous and is provided to one or more synchronization latches to synchronize the test mode input signal with the synchronous system clock signal,
the synchronized test mode input signal and a full clock rate signal are provided as inputs to a second AND gate which outputs a unit test hold signal, and
the unit test hold signal and a synchronized test hold signal output from the first AND gate are provided as inputs to a first OR gate which outputs an output signal to be distributed to the one or more first devices.

8. The method of claim 1, wherein the synchronous operation is one of a power-on-reset operation, a manufacturing test sequence, or a debug operation.

9. The method of claim 1, wherein the method is implemented by a test hold generation circuit provided in a test control unit of the integrated circuit.

10. An apparatus for performing a synchronous operation across a synchronous/asynchronous clock domain boundary, comprising: test hold generation logic unit; and a switching unit, coupled to the test hold generation logic unit, associated with one or more first devices in an asynchronous clock domain, wherein the test hold generation logic controls the switching unit to: switch the one or more first devices from an asynchronous clock mode of operation to a synchronous clock mode of operation, and return the one or more first devices to the asynchronous clock mode of operation, and wherein a synchronous operation is performed using one or more second devices in a synchronous clock domain and the one or more first devices in the asynchronous clock domain while the one or more first devices are in the synchronous clock mode of operation, wherein the test hold generation logic receives a test mode input signal and an asynchronous clock hold signal which are used to generate a test hold signal to be distributed to each of the one or more first devices, and wherein the switching unit receives a system clock enable signal to switch an input clock to the one or more first devices from a local asynchronous clock signal to a synchronous system clock signal, wherein the test mode input signal indicates whether latches in asynchronous clock distribution logic are permitted to be clocked by asynchronous signals or not, the system clock enable signal indicates whether the synchronous system clock signal is to be used or not, and the asynchronous clock hold signal controls switching between a the local asynchronous clock signal and the synchronous system clock signal.

11. The apparatus of claim 10, wherein the switching unit is a multiplexed local clock buffer that multiplexes the local asynchronous clock signal and the synchronous system clock signal.

12. The apparatus of claim 10, wherein an input clock to the one or more first devices is switched from the local asynchronous clock signal to the synchronous system clock signal by:
    asserting the asynchronous clock hold signal is asserted to a first AND gate of the test hold generation logic unit;
    asserting the test mode input signal to the first AND gate in the test hold generation logic unit; and
    asserting the system clock enable signal to the switching unit associated with the one or more first devices, wherein the asynchronous clock hold signal and the test mode input signal are ANDed by the first AND gate in the test hold generation logic to generate a test hold signal, wherein the system clock enable signal causes the synchronous system clock signal to be selected by the switching unit for clocking the one or more first devices.

13. The apparatus of claim 12, wherein the test mode input signal is asserted after a test mode delay period following assertion of the asynchronous clock hold signal, and wherein the system clock enable signal is asserted after a system clock enable delay period following assertion of the test mode input signal.

14. The apparatus of claim 12, wherein an input clock to the one or more first devices is switched from the synchronous system clock signal to the local asynchronous clock signal by:
    determining if a synchronous operation has completed;
    de-asserting the system clock enable signal to the one or more first devices, if a synchronous operation has completed;
    de-asserting the test mode input signal to the AND gate in the test hold generation logic, if a synchronous operation has completed; and
    de-asserting the asynchronous clock hold signal to the AND gate in the test hold generation logic, if a synchronous operation has completed.

15. The apparatus of claim 12, wherein:
the test mode input signal is asynchronous and is provided to one or more synchronization latches in the test hold generation logic unit to synchronize the test mode input signal with the synchronous system clock signal,
the synchronized test mode input signal and a full clock rate signal are provided as inputs to a second AND gate in the test hold generation logic unit which outputs a unit test hold signal, and
the unit test hold signal and a synchronized test hold signal output from the first AND gate are provided as inputs to a first OR gate in the test hold generation logic unit which outputs an output signal to be distributed to the one or more first devices.

16. The apparatus of claim 15, wherein:
a scan gate signal and an activate signal are provided to a second OR gate of the switching unit,
an output of the second OR gate associated with the switching unit one or more first devices is provided as an input to a NAND gate of the switching unit,
the output signal of the first OR gate is provided to the NAND gate of the switching unit, and an output of the NAND gate is provided to a third OR gate of the switching unit, and
an output of a multiplexer of the switching unit is provided as an input to the third OR gate of the switching unit.

17. The apparatus of claim 10, wherein the synchronous operation is one of a power-on-reset operation, a manufacturing test sequence, or a debug operation.

* * * * *